US012769155B2

(12) United States Patent
Wong et al.

(10) Patent No.: US 12,769,155 B2
(45) Date of Patent: Oct. 20, 2026

(54) SPATIAL LIGHT MODULATION DEVICE AND WAVELENGTH SELECTIVE SWITCH

(71) Applicant: HUAWEI TECHNOLOGIES CO., LTD., Shenzhen (CN)

(72) Inventors: Man Kai Wong, Markham (CA); Zhiping Jiang, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 404 days.

(21) Appl. No.: 18/450,068

(22) Filed: Aug. 15, 2023

(65) Prior Publication Data

US 2025/0060619 A1 Feb. 20, 2025

(51) Int. Cl.
*G02F 1/01* (2006.01)

(52) U.S. Cl.
CPC .................................. *G02F 1/0147* (2013.01)

(58) Field of Classification Search
CPC .................................................... G02F 1/0147
See application file for complete search history.

(56) References Cited

U.S. PATENT DOCUMENTS 11,187,889 B2 11/2021 Falk et al.
11,187,891 B1 11/2021 Moon et al.
11,320,647 B2 5/2022 Chou et al.
2005/0207313 A1* 9/2005 Handschy ............ G11B 7/1369
2020/0183108 A1* 6/2020 Zhang .................. G02B 6/4279
2021/0231982 A1* 7/2021 Castillo ................. G02F 1/1365
2022/0382081 A1* 12/2022 Hosseini ............... G02F 1/0147
2024/0329784 A1* 10/2024 Han ...................... G06F 3/0412
(Continued)

FOREIGN PATENT DOCUMENTS

CN 106772813 A 5/2017
CN 110352379 A 10/2019
CN 112384847 A 2/2021
(Continued)

OTHER PUBLICATIONS

Dauderstadt et al., Analog Spatial Light Modulators Based on Micromirror Arrays, Micromachines 2021, 12, 483, https://doi.org/10.3390/mi12050483.
(Continued)

*Primary Examiner* — Mariam Qureshi
(74) *Attorney, Agent, or Firm* — BCF LLP

(57) ABSTRACT

A spatial light modulation (SLM) device is disclosed. The SLM device includes an electronic backplane and a pixel array structure including a plurality of pixels. Each pixel includes a reflective layer disposed atop the electronic backplane, a phase change material (PCM) layer disposed atop the reflective layer, a phase of the PCM layer being selectively in a crystalline state or an amorphous state based on a temperature thereof and an encapsulation layer disposed atop the PCM layer such that the PCM layer is sandwiched between the reflective layer and the encapsulation layer. The electronic backplane is operatively connected to a controller and generates electrical current for defining an independent heat profile in the PCM layer of each pixel through Joule's effect, a variation of the phase of the PCM layer being used to modulate optical properties of an incoming optical signal reaching the spatial light modulation device.

10 Claims, 5 Drawing Sheets

(56) References Cited

U.S. PATENT DOCUMENTS

2025/0093688 A1* 3/2025 Hao .................... G02F 1/0121
2025/0094380 A1* 3/2025 Mazed .................... G01S 17/08

FOREIGN PATENT DOCUMENTS

CN 112415785 A 2/2021
WO 2023138307 A1 7/2023

OTHER PUBLICATIONS

Hendrickson et al., Electrically actuated phase-change pixels for transmissive and reflective spatial light modulators in the near and mid infrared, Optical Society of America, vol. 54, No. 36, Dec. 20, 2015, http://dx.doi.org/10.1364/AO.54.010698.
Kim et al., Crafting a 1.5 um pixel pitch spatial light modulator using Ge2Sb2Te5 phase change material [Invited], Journal of the Optical Society of America A, vol. 36, No. 12, Dec. 2019, https://doi.org/10.1364/JOSAA.36.000D23.
Benara, Backplane System Design Considerations for Micro LED Displays, Rochester Institute of Technology, Theses, Dec. 2020, https://scholarworks.rit.edu/theses?utm_source=scholarworks.rit.edu%2Ftheses%2F10680&utm_medium=PDF&utm_campaign=PDFCoverPages.
Harasthy et al., Current Summary of the Practical Using of Optical Correlators, Acta Electrotechnica et Informatica, vol. 12, No. 4, 2012, pp. 30-38, DOI: 10.2478/v10198-012-0042-2.
Dragulinescu, Optical Correlators for Cryptosystems and Image Recognition: A Review, Sensors, 2023, 23-907, https://doi.org/10.3390/s23020907.
Topic 12: Spatial Light Modulators and Modern Optical Systems, The University of Edinburgh, Modern Optics, Applied Optics Group—Department of Physics.
Peng et al., Design of high-speed phase-only spatial light modulators with two-dimensional tunable microcavity arrays, Optics Express, vol. 27, No. 21, Oct. 14, 2019.
Zou et al., Phase change material based tunable reflectarray for free-space optical inter/intra chip interconnects, Optics Express, Oct. 6, 2014, vol. 22, No. 20, DOI:10.1364/OE.22.024142.
Yin et al., Beam switching and bifocal zoom lensing using active plasmonic metasurfaces, Light: Science & Applications (2017) 6, e17016; doi:10.1038/Isa.2017.16.
Zhang et al., Electrically reconfigurable non-volatile metasurface using low-loss optical phase-change material, Nature Nanotechnology, vol. 16, Jun. 2021, pp. 661-666.
Ruiz et al., Nonvolatile Reconfigurable Phase-Change Metadevices for Beam Steering in the Near Infrared, Adv. Funct. Mater. 2018, 28, 1704993.
Moore et al., The Silicon Backplane Design for an LCOS Polarization-Insensitive Phase Hologram SLM, IEEE Photonics Technology Letters, vol. 20, No. 1, Jan. 1, 2008.
Zhang et al., Fundamentals of phase-only liquid crystal on silicon (LCOS) devices, Light: Science & Applications, (2014) 3, e213; doi:10.1038/Isa.2014.94.
Delaney et al., A New Family of Ultralow Loss Reversible Phase-Change Materials for Photonic Integrated Circuits: Sb2S3 and Sb2Se3, Adv. Funct. Mater., 2020, 30, 2002447.
Sahoo et al., GSST phase change materials and its utilization in optoelectronic devices: A review, Material Research Bulletin, 148, 2022, 111679, https://doi.org/10.1016/j.materresbull.2021.111679.
Tsai et al., LCoS-SLM technology based on Digital Electro-optics Platform and using in dynamic optics for application development, 14th Conference on Education and Training in Optics and Photonics, ETOP 2017, Aug. 16, 2017, Hangzhou, China.
Lazarev et al., Beyond the display: phase-only liquid crystal on Silicon devices and their applications in photonics [Invited], Optics Express, May 27, 2019, vol. 27, No. 11, https://doi.org/10.1364/OE.27.016206.
Muller et al., Tailoring Crystallization Kinetics of Chalcogenides for Photonic Applications, Adv. Electron. Mater., 2022, 8, 2100974.
Zhang et al., Myths and truths about optical phase change materials: A perspective, Research Article, May 26, 2021, Appl. Phys. Lett., 118, 210501.
Wuttig et al., Phase-change materials for non-volatile photonic applications, Nature Photonics, vol. 11, Aug. 2017.
Delaney et al., Nonvolatile programmable silicon photonics using an ultralow-loss Sb2Se3 phase change material, Sci. Adv., 2021; 7:eabg3500.
Jia et al., Visible and near-infrared programmable multi-level diffractive lenses with phase change material Sb2S3, Optics Express, Feb. 28, 2022, vol. 30, No. 5, https://doi.org/10.1364/OE.452472.
Yang et al., Small phase pattern 2D beam steering and a single LCOS design of 40 1 × 12 stacked wavelength selective switches, Optics Express, May 30, 2016, vol. 24, No. 11, Ol:10.1364/OE.24.012240.
Chu et al., 2D Beam Steering and Stacked LCOS WSSs for Cost-Effective Optical Networks, 2020 IEEE.
Zhang et al., Miniature Multilevel Optical Memristive Switch Using Phase Change Material, ACS Photonics 2019, 6, pp. 2205-2212, http://pubs.acs.org/action/showCitFormats?doi=10.1021/acsphotonics.9b00819.
Harriman et al., Transmissive spatial light modulators with high figure-of-merit liquid crystals for foveated imaging applications, Integrated Optoelectronic Devices 2006, 2006, San Jose, California, United States.
Iwasaki et al., Practical Magneto-Optic Spatial Light Modulator With Single Magnetic Domain Pixels, IEEE Transactions on Magnetics, vol. 44, No. 11, Nov. 2008.
Takagi et al., Magneto-optic spatial light modulator with submicron-size magnetic pixels for wide-viewing-angle holographic displays, Optics Letters, vol. 39, No. 11, Jun. 1, 2014.
Kharratian et al., RGB Magnetophotonic Crystals for High-contrast Magnetooptical Spatial Light Modulators, Scientific Reports, (2019) 9:644, DOI:10.1038/s41598-018-37317-9.
Ahearn et al., Multiple quantum well (MQW) spatial light modulators (SLMs) for optical data processing and beam steering, International Symposium on Optical Science and Technology, 2001, San Diego, CA, United States.
Davis et al., Current Status of the Magneto-Optic Spatial Light Modulator, 33rd Annual Technical Symposium, 1989, San Diego, United States.
Tomer et al., A Phase Change Material for Reconfigurable Circuit Applications, Appl. Sci., 2018, 8-130, http://dx.doi.org/10.3390/app8010130.
Nabil et al., A Four-Terminal, Inline, Chalcogenide Phase-Change RF Switch Using an Independent Resistive Heater for Thermal Actuation, IEEE Electron Device Letters, vol. 34, No. 10, Oct. 2013.
Fei et al., On-Chip Reconfigurable and Ultracompact Silicon Waveguide Mode Converters Based on Nonvolatile Optical Phase Change Materials, Nanomaterials, 2022, 12, 4225, https://doi.org/10.3390/nano12234225.
Arjunan et al., Multilevel accumulative switching processes in growth-dominated AgInSbTe phase change material, Optics Letters, vol. 44, No. 12, Jun. 15, 2019.
Tong et al., Implementation of 10-Bit Phase Modulation for Phase-Only LCOS Devices Using Deep Learning, Advanced Devices & Instrumentation, vol. 2020, Article ID 9515747, 10 pages, https://doi.org/10.34133/2020/9515747.
Rios et al., Multi-Level Electro-Thermal Switching of Optical Phase-Change Materials Using Graphene, Adv. Photonics Res., 2020, 2000034, DOI: 10.1002/adpr.202000034.
Chiang et al., Fringing Field Effect of the Liquid-Crystal-on-Silicon Devices, Jpn. J. Appl. Phys., vol. 41 (2002), Part 1, No. 7A, Jul. 2002, pp. 4577-4585.
Lei et al., Magnetron-sputtered and thermal-evaporated low-loss Sb—Se phase-change films in non-volatile integrated photonics, Optical Materials Express, vol. 12, No. 7, Jul. 1, 2022.
Raeis-Hosseini et al., Metasurfaces Based on Phase-Change Material as a Reconfigurable Platform for Multifunctional Devices, Materials, 2017, 10, 1046, http://dx.doi.org/10.3390/ma10091046.

(56) References Cited

OTHER PUBLICATIONS

Nisar et al., On-Chip Integrated Photonic Devices Based on Phase Change Materials, Photonics, 2021, 8, 205, https://doi.org/10.3390/photonics8060205.

Talarico, "CMOS Fabrication and Layout", Gonzaga University, EENG 406:Lectures, Spring 2017, Slide Set 4, retrieved from Lectures list on https://web02.gonzaga.edu/faculty/talarico/EE406/20172018/lec.html.

Efron, "Multiple Quantum Well Spatial Light Modulators", Proc. SPIE 1150, Spatial Light Modulators and Applications III, May 22, 1990, 33rd Annual Technical Symposium, San Diego, United States, doi: 10.1117/12.962187.

* cited by examiner

200

SPATIAL LIGHT MODULATION DEVICE AND WAVELENGTH SELECTIVE SWITCH

TECHNICAL FIELD

The present disclosure generally relates to the field of systems for optical signal modulation and, in particular, to a spatial light modulation device.

BACKGROUND

Spatial light modulators (SLM) are transmissive or reflective devices that are used to spatially modulate the amplitude, phase, and/or polarization of an incident optical wavefront in two dimensions. Recent developments of SLMs have led to the use of SLMs for different applications such as optical beam steering, optical switching, coherent optical processing, projection/display systems, holographic systems, diffractive optics, optical elements for beam shaping, and metrology.

There thus remains a desire for spatial light modulation devices addressing at least some of the above issues.

SUMMARY

The embodiments of the present disclosure have been developed based on developers' appreciation of the limitations associated with the prior art.

In accordance with a first broad aspect of the present disclosure, there is provided a spatial light modulation device including an electronic backplane and a pixel array structure comprising a plurality of pixels. Each pixel includes a reflective layer disposed atop the electronic backplane, a phase change material (PCM) layer disposed atop the reflective layer, a phase of the PCM layer being selectively in a crystalline state or an amorphous state based on a temperature thereof and an encapsulation layer disposed atop the PCM layer such that the PCM layer is sandwiched between the reflective layer and the encapsulation layer. The electronic backplane is operatively connected to a controller, the electronic backplane being configured to generate, based on instructions received from the controller, electrical current for defining an independent heat profile in the PCM layer of each pixel of the pixel array structure through Joule's effect, a variation of the phase of the PCM layer being used to modulate optical properties of an incoming optical signal reaching the spatial light modulation device.

In some non-limiting implementations, the spatial light modulation device further includes, for a given pixel of the plurality of pixels, a first electrode and a second electrode thermally connected to the reflective layer and distant from one another, the controller being configured to cause the electronic backplane to generate electrical current flowing from the first electrode to the second electrode to define heat profiles in the PCM layer through Joule's effect.

In some non-limiting implementations, the spatial light modulation device further includes a heater layer thermally connected to the first and second electrodes and an electrically insulating layer disposed between the reflective layer and the heater layer.

In some non-limiting implementations, the heater layer is made of aluminum doped zinc oxide (AZO) and the insulating layer is made of aluminum nitride (AlN).

In some non-limiting implementations, the PCM layer is formed from one of antimony trisulfide ($Sb_2S_3$) and antimony triselenide ($Sb_2Se_3$).

In some non-limiting implementations, the electronic backplane is a Silicon-based Complementary Metal Oxide Semiconductor (CMOS) backplane, the reflective layer is made of aluminum, and the encapsulation layer is made of indium tin oxide (ITO).

In some non-limiting implementations, the pixel array structure configured for an active matrix driving scheme.

In some non-limiting implementations, the controller has a digital driving scheme, the controller being configured to adjust a pulse width and a pulse duration of the electrical current.

In some non-limiting implementations, the spatial light modulation device further includes an electric current mirroring circuit communicably connected to the controller for defining an electric current programming scheme of the optical modulation device.

In some non-limiting implementations, the spatial light modulation device further includes a glass layer disposed atop the encapsulation layer.

In accordance with a second broad aspect of the present disclosure, there is provided a wavelength selective switch (WSS) device including an input/output optical module configured to receive an incoming optical signal and output a processed optical signal, an imaging optical module receiving the incoming optical signal from the input/output optical module, the imaging optical module comprising a diffraction grating, a spatial light modulation device configured to receive the incoming optical signal from the imaging optical module. The spatial light modulation device includes an electronic backplane, a reflective layer defining a pixel array structure comprising a plurality of pixels, the reflective layer being disposed atop the electronic backplane, a phase change material (PCM) layer disposed atop each pixel of the pixel array structure, a phase of the PCM layer being selectively in a crystalline state or an amorphous state based on a temperature thereof; and an encapsulation layer disposed atop the PCM layer such that the PCM layer is sandwiched between the reflective layer and the encapsulation layer. The WSS device also includes a controller communicably connected to the spatial light modulation device, the controller being configured to cause the electronic backplane of the spatial light modulation device to generate, based on instructions received from the controller, electrical current for defining an independent heat profile in the PCM layer of each pixel of the pixel array structure through Joule's effect, a variation of the phase of the PCM layer being used to modulate optical properties of an incoming optical signal reaching the spatial light modulation device.

In some non-limiting implementations, the SLM device further comprises, for a given pixel of the plurality of pixels, a first electrode and a second electrode thermally connected to the reflective layer and distant from one another, the controller being configured to cause the electronic backplane to generate electrical current flowing from the first electrode to the second electrode to define heat profiles in the PCM layer through Joule's effect.

In some non-limiting implementations, the SLM device further includes, for a given pixel of the plurality of pixels, a heater layer thermally connected to the first and second electrodes and an electrically insulating layer disposed between the reflective layer and the heater layer.

In some non-limiting implementations, the PCM layer of the SLM is made of antimony trisulfide ($Sb_2S_3$) or antimony triselenide ($Sb_2Se_3$).

In some non-limiting implementations, the electronic backplane of the SLM is a Silicon-based Complementary Metal Oxide Semiconductor (CMOS) backplane.

In some non-limiting implementations, the pixel array structure has an active matrix driving scheme.

In some non-limiting implementations, the SLM further comprises a glass layer disposed atop the encapsulation layer.

In some non-limiting implementations, the controller has a digital driving scheme, the controller being configured to adjust a pulse width and a pulse duration of the electrical current.

In some non-limiting implementations, the SLM further comprises an electric current mirroring circuit communicably connected to the controller for defining an electric current programming scheme of the optical modulation device.

In some non-limiting implementations, two consecutive pixels of the pixel array structure are separated by trenches extending down into the backplane through the encapsulation layer, the PCM layer and the reflective layer.

BRIEF DESCRIPTION OF THE DRAWINGS

The features and advantages of the present disclosure will become apparent from the following detailed description, taken in combination with the appended drawings, in which.

Figure 1:
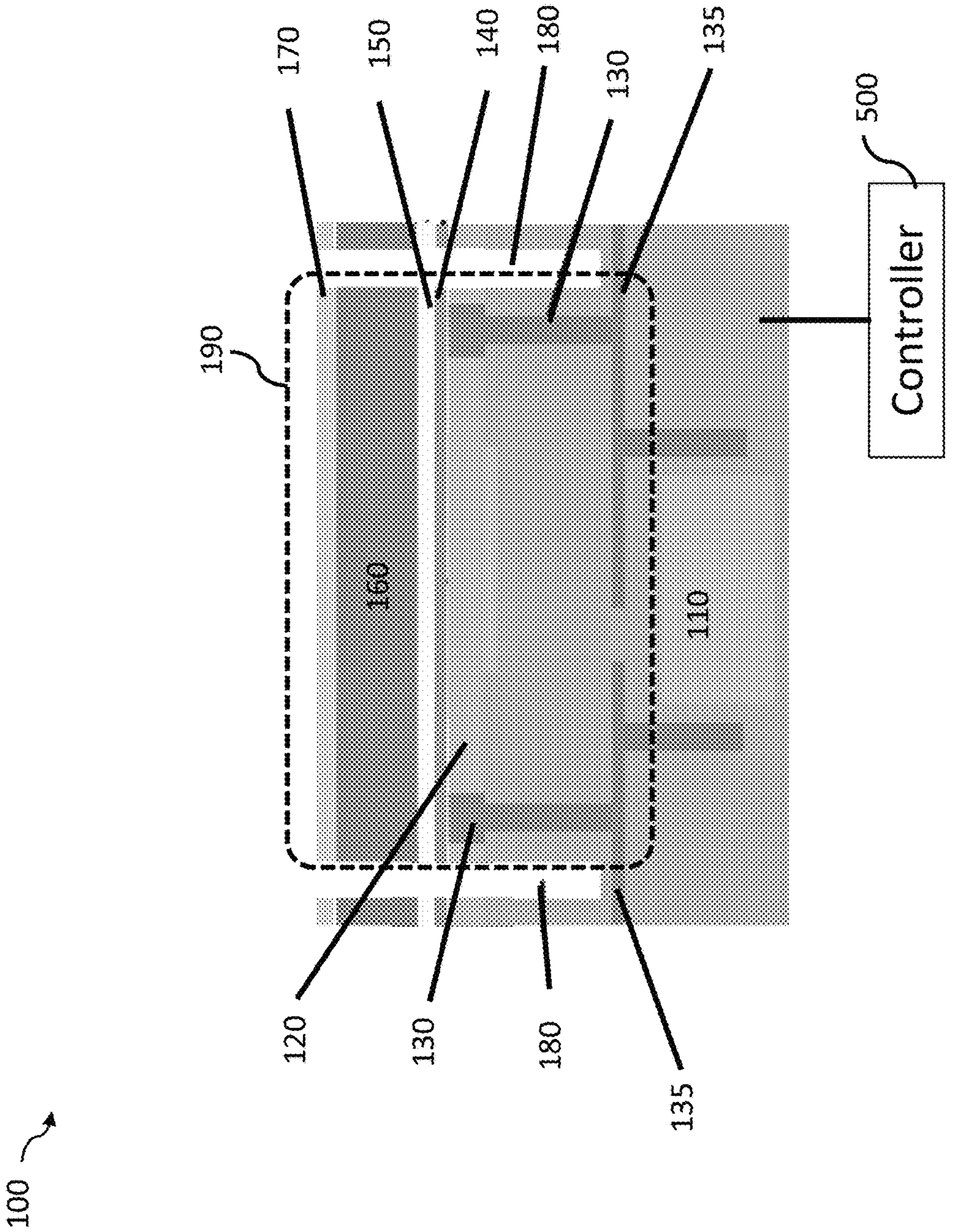
FIG. 1 is a schematic cross-section view of a spatial light modulation (SLM) device in accordance with non-limiting implementations of the present technology.

It is to be understood that throughout the appended drawings and corresponding descriptions, like features are identified by like reference characters. Furthermore, it is also to be understood that the drawings and ensuing descriptions are intended for illustrative purposes only and that such disclosures are not intended to limit the scope of the claims.

DETAILED DESCRIPTION

The instant disclosure is directed to address at least some of the deficiencies of the current technology. Unless otherwise defined or indicated by context, all technical and scientific terms used herein have the same meaning as commonly understood by one of ordinary skill in the art to which the described embodiments appertain. To the best of developers' knowledge, typical spatial light modulators (SLMs) cannot perform phase-only modulation and simultaneously achieve: (1) high modulation speed of >1 kHz, (2) polarization-independence, and (3) broad optical bandwidth >50 nm. Therefore, none of the current SLMs fulfills all of the desired performance characteristics required for next-generation Wavelength Selective Switches (WSS).

Various representative embodiments of the described technology will be described more fully hereinafter with reference to the accompanying drawings, in which representative embodiments are shown. The present technology concept may, however, be embodied in many different forms and should not be construed as limited to the representative embodiments set forth herein. Rather, these representative embodiments are provided so that the disclosure will be thorough and complete, and will fully convey the scope of the present technology to those skilled in the art. In the drawings, the sizes and relative sizes of layers and regions may be exaggerated for clarity.

It will be understood that, although the terms first, second, third, etc. may be used herein to describe various elements, these elements should not be limited by these terms. These terms are used to distinguish one element from another. Thus, a first element discussed below could be termed a second element without departing from the teachings of the present technology. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is only intended to describe particular representative embodiments and is not intended to be limiting of the present technology. As used herein, the singular forms "a," "an" and "the" are intended to include the plural forms as well, unless the context clearly indicates otherwise. It will be further understood that the terms "comprises" and/or "comprising." when used in this specification, specify the presence of stated features, integers, steps, operations, elements, and/or components, but do not preclude the presence or addition of one or more other features, integers, steps, operations, elements, components, and/or groups thereof.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

In the context of the present specification, unless provided expressly otherwise, the words "first", "second", "third", etc. have been used as adjectives only for the purpose of allowing for distinction between the nouns that they modify from one another, and not for the purpose of describing any particular relationship between those nouns. Thus, for example, it should be understood that the use of the terms "first processor" and "third processor" is not intended to imply any particular order, type, chronology, hierarchy or ranking (for example) of/between the processor, nor is their use (by itself) intended to imply that any "second processor" must necessarily exist in any given situation. Further, as is discussed herein in other contexts, reference to a "first" element and a "second" element does not preclude the two elements from being the same actual real-world element. Thus, for example, in some instances, a "first" processor and a "second" processor may be the same software and/or hardware, in other cases they may be different software and/or hardware.

Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

In the context of the present disclosure, a spatial light modulation (SLM) device is an optoelectronic device that allows the control and manipulation of light waves in space. By modulating the phase, amplitude, or polarization of light waves, SLMs enable precise control and manipulation of light at the spatial level. A SLM device usually involves the use of an array of pixels or elements, each of which can independently modulate the properties of light passing through it. The pixels can be controlled electronically, allowing for real-time adjustments and flexibility in shaping the output light. Depending on the specific technology used in the prior art, SLMs can employ various mechanisms to modulate light, such as liquid crystals, micro-electro-mechanical systems (MEMS), or digital micro-mirror arrays (DMD). It can be said that a SLM device as a dynamic optical element that can modify the characteristics of light in real-time, enabling the manipulation of light waves in a spatially varying manner.

FIG. 1 is a schematic cross-section view of a spatial light modulation (SLM) device 100 in accordance with non-limiting implementations of the present technology. The SLM device 100 includes an electronic backplane 110 and a heater layer 120 disposed atop the electronic backplane 110. In some implementations, the electronic backplane 110 is a Silicon-based complementary metal oxide semiconductor (CMOS) backplane and the heater layer 120 is made of aluminum doped zinc oxide (AZO).

The electronic backplane 110 includes two or more electrodes 130 that are electrically connected to one another through the heater layer 120. In this implementation, a distal end of each electrode 130 is located in the heater layer 120. The electrodes 130 are provided with electric current through electric interconnecting sections 135 define in the electronic backplane 110. As will be described in greater detail herein after, the electronic backplane 110 is operably connected to a controller 500 configured to adjust a pulse width and a pulse duration of the electrical current flowing between the electrodes 130 of the SLM device 100. Broadly speaking, the electronic backplane 110 generates electrical current based on instructions received from the controller 500.

The SLM device 100 further includes an electrically insulating layer 140 disposed atop the heater layer 120. For example and without limitation, the electrically insulating layer 140 may be made of a material having a relatively high thermal conductivity and relatively high electrical resistivity such as aluminum nitride (AlN).

The SLM device 100 further includes a reflective layer 150 disposed atop the electrically insulating layer 140, a phase change material (PCM) layer 160 disposed atop the reflective layer 150 and an encapsulating layer 170 disposed atop the PCM layer 160. In the context of the present disclosure, a PCM material is a material whose phase can be either crystalline or amorphous depending on a temperature of the PCM material. More specifically, a switching of the phase of the PCM material from crystalline to amorphous state requires heating of the material above the melting point for a short time duration, while switching back from amorphous to crystalline state requires setting the temperature to be between the crystallization and melting points for a longer duration of time.

In this implementation, the material of the PCM layer 160 exhibits a refractive index change $\Delta n$ between the material structure on the order of ~1, which enables $2\pi$ or larger phase shift in non-resonant structures. The PCM layer 160 has a thickness of a few microns or less; the specific thickness of the PCM layer 160 may vary in different implementations. In addition, the material of the PCM layer 160 is non-birefringent, which means any polarization of the optical signal experiences the same $\Delta n$. Therefore, it can be said that the SLM device 100 is polarization-independent. In the illustrated implementation, the PCM layer 160 is formed from antimony trisulfide ($Sb_2S_3$) or antimony triselenide ($Sb_2Se_3$). These materials have a sufficiently long crystallization time to permit reversible switching to occur for film thicknesses of >1 μm, and have a crystallization time low enough such that the required switching speed of >1 kHz for WSS application can be achieved.

In use, the SLM device 100 receives an optical signal at the encapsulating layer 170 and through the PCM layer 160. The optical signal is further reflected at the reflective layer 150. In this implementation, the electronic backplane 110 causes electric current to flow between the electrodes 130 and through the heater layer 140 in order to create heat profiles in the PCM layer 160 through Joule's effect. The heat profiles thus cause the phase of the PCM to change accordingly. Therefore, the phase of the PCM of the layer 160 can be locally adjusted to induces a phase shift in the incident light passing through the PCM layer 160. Broadly speaking, the phase shift introduced by the PCM layer 160 allows for control of the light wavefront. This modulation of the phase can be used to manipulate properties of light, such as intensity, polarization, or direction.

It should be noted that FIG. 1 shows a pixel 190 of the SLM device 100. It should be understood that the SLM device 100 may define a pixel array structure including a plurality of pixels defined on the electronic backplane 110, each pixel including at least two respective electrodes 130, a respective heater layer 140, a respective reflective layer 150, a respective PCM layer 160 and a respective encapsulation layer 170.

In the illustrated implementation, the SLM device 100 defines trenches 180 between consecutive pixels of the pixel array structure. The trenches 180 provide a generally vertically extending insulating barrier between adjacent pixels. For example, air may flow in the trenches 180. Thermally and electrically insulating material may be additionally or alternatively used in the trenches 180 to prevent heat thermal energy and/or electric current from passing from one pixel to another and alter a heat profile in the PCM layer 160 thereof.

In some implementations, the SLM device 100 is formed as follows. The heater layer 120 is deposited onto the Silicon-based CMOS backplane using Radio-frequency (RF) sputtering. The heater layer 120 is planarized through chemical mechanical polishing and thermal anneal is applied. The electrically insulating layer 120 is deposited atop the heater layer 120 using pulsed DC reactive sputtering. The reflective layer 150 is then deposited onto the electrically insulating layer 140 and polished using physical vapor deposition (PVD) or chemical vapor deposition (CVD). The CPM layer 160 is further deposited onto the reflective layer 150 using magnetron sputtering. The encapsulation layer 170 is then deposited onto the PCM layer 160 using reactive sputtering. Inductively coupled plasma reactive ion etching (ICP-RIE) is successively executed with $Cl_2$/HBr to etch the encapsulation layer 170, with AR;$CF_4$ to etch the PCM layer 160, with $Cl_2$/HBr to etch the reflective layer 150, with AR/$Cl_2$/$BCl_3$ to etch the electrically insulating layer 140, with Ar/$BCl_3$ to etch the heater layer 120 and with $CF_4$/$CH_4$ to etch the electronic backplane 110. Said etching thus defines the trenches 180 of the SLM device 100.

Figure 2:
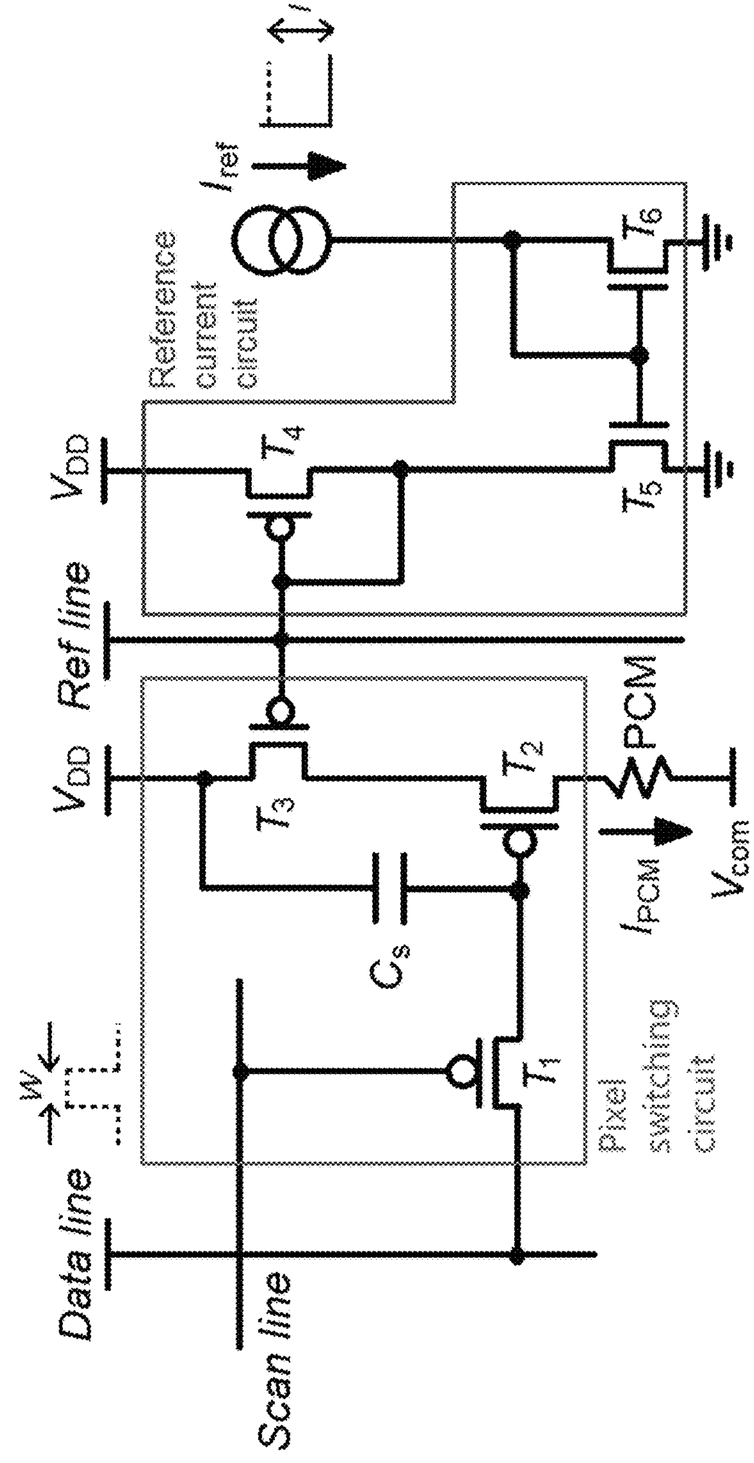
FIG. 2 is an electric diagram of a control circuit for the SLM device of FIG. 1.

FIG. 2 is an electric diagram of a control circuit 200 for the SLM device 100 in accordance with some non-limiting implementations of the present technology. The control circuit 200 is implemented in the electronic backplane 110 to control one pixel of the SLM device 100 such as the pixel 190. Broadly speaking, a function of the control circuit 200 is to control an amplitude and a time width of electric pulses flowing between the electrodes 130 that serve to define the heat profiles in the PCM layer 160 of the pixel. Broadly speaking, the control circuit 200 enable provision of a fixed current to the corresponding pixel by including a so-called current mirror defined by two transistors, in which two other switching transistors enable the application of Pulse Width Modulation (PWM) data by voltage levels that turn the fixed mirrored current on or off.

The control circuit 200 includes a scan line 210 to select the pixel to be operated on, a data line 220 for setting the pulse width and a reference line 230 shared by all the pixel circuits of the pixel array structure of the SLM device 100. $T_1$ to $T_6$ are metal-oxide-semiconductor field-effect transistors (MOSFET), $C_s$ is a storage capacitor, $V_{DD}$ is the drive voltage for the PCM pixel, and $V_{com}$ is a common negative electric power.

In use, the control circuit 200 utilizes a digital driving circuit (pixel switching circuit) that enables setting the current pulse width (W) by the corresponding voltage pulse on the data line while using a current mirror (reference current circuit) to keep a fixed current level, and simultaneously, the reference current source ($I_{ref}$) and thus the current across the PCM pixel (IPCM) can be set to multiple different amplitudes (I) instead of a constant current.

Figure 3:
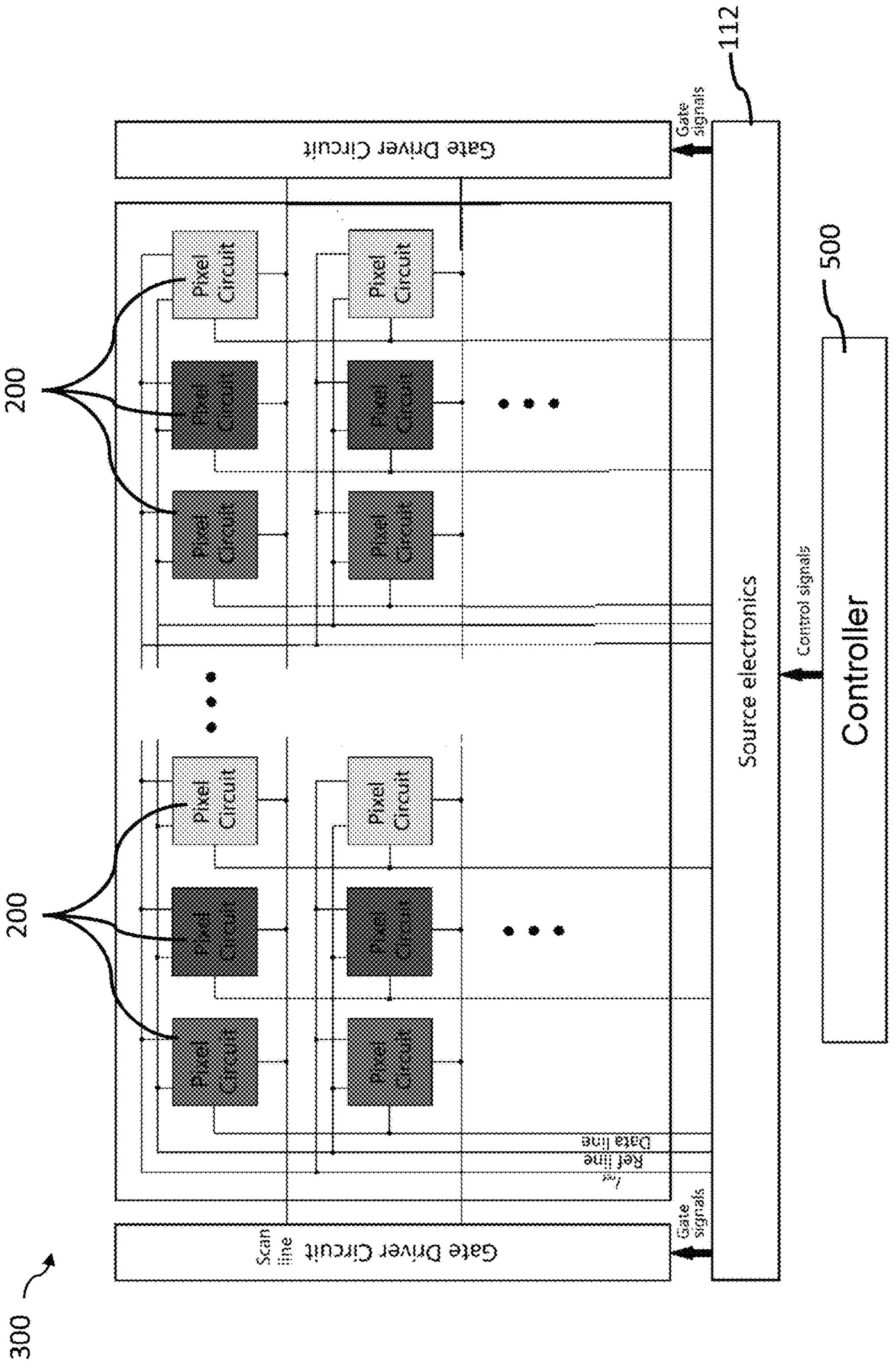
FIG. 3 is a schematic diagram of an electronic system architecture of the SLM device of FIG. 1.

An electronic system architecture 300 of the electronic backplane 110 of the SLM device 100 is schematically shown in FIG. 3. The electronic system architecture 300 includes a control circuit 200 for each of the pixel of the SLM device 100. In this implementation, the pixel addressing scheme is an active matrix architecture. Indeed, in active matrix driving, all pixels contain a storage element (i.e. a capacitor) that allows them to remain active throughout the switching cycle until their values are updated again. Therefore, the pixels may be activated even when other lines of the electronic system architecture 300 are being programmed. Active matrix designs thus offer benefits in power consumption (e.g. heat dissipation), cost, and image quality.

The electronic system architecture 300 makes use of an electrical current source denoted $I_{ref}$ and each pixel is driven by a hybrid combination of digital scheme for current pulse width control and analog programming for current amplitude control. The electronic system architecture 300 includes the controller 500 in some implementations. In some other implementations, the architecture 300 and the controller 500 could be separately provided. The controller 500 communicates with source electronic components 112 of the electronic backplane 110 to transmit control signals that drive the source electronic components 112, which in turn simultaneously feeds the control circuits 200 via the data lines and accesses the rows by sending gate signals to a gate driver that feeds the scan lines.

Additionally in this implementation, the electronic system architecture 300 of the SLM device 100 is based on a digital driving scheme, such that the pulse width of the current source is controlled to set a phase level. Unlike the traditional digital driving technique, only a single pulse may be employed for each pixel per frame rather than the average current by PWM techniques, as required for switching the PCM between its amorphous and crystalline state.

In some implementations, the SLM 100 is implemented within a wavelength selective switch (WSS) device. For example, such a WSS device could be implemented as a part of a reconfigurable optical add-drop multiplexer (ROADM) used in dense wavelength division multiplexing (DWDM) in reconfigurable Agile Optical Networks (AON). Typical WSS devices are mainly deployed in the core transport network where traffic is scheduled at the wavelength level and enable switching without converting optical to electrical signals. Broadly speaking, WSS can dynamically route, block, and attenuate all DWDM wavelengths within a network node. It consists of a single common optical port and N opposing multi-wavelength ports where each DWDM wavelength input from the common port can be switched (routed) to any one of the N multi-wavelength ports, independent of how all other wavelength channels are routed.

Figure 4:
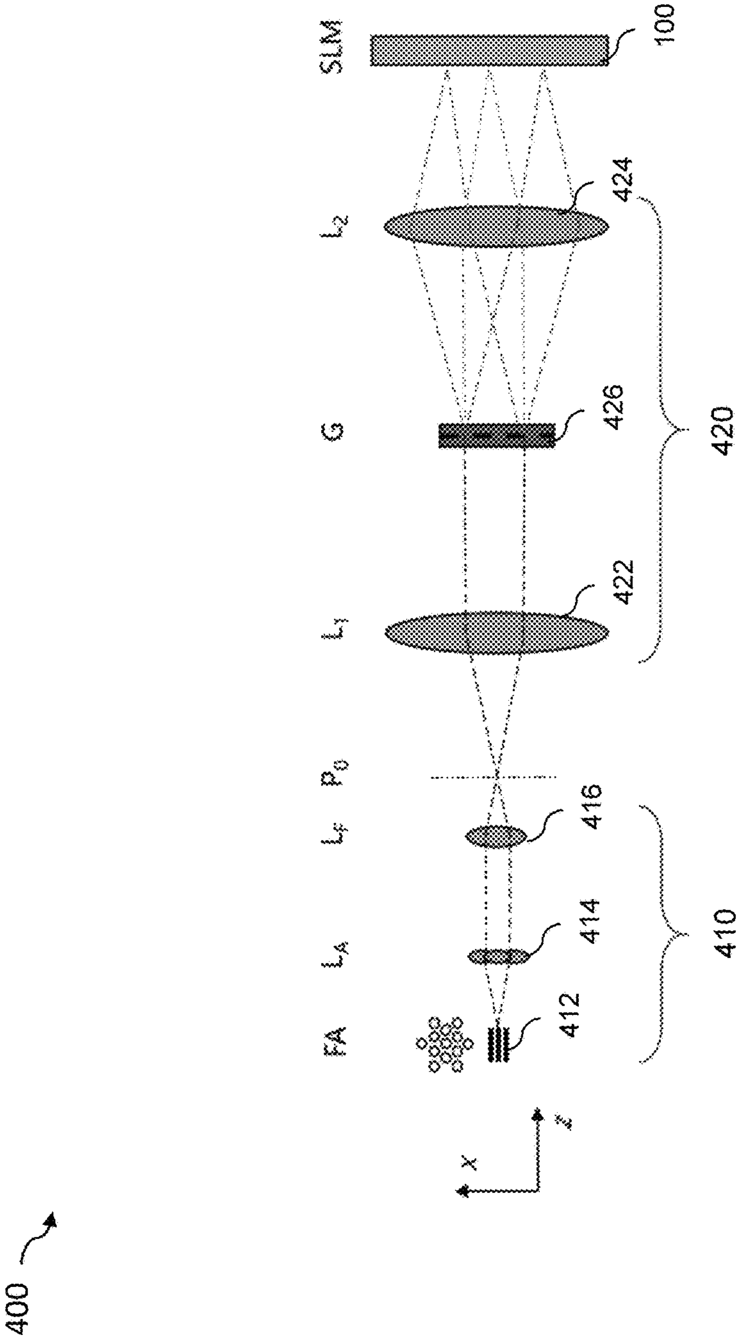
FIG. 4 is a schematic optical architecture of a Wavelength Selective Switch (WSS) device implementing the SLM device of FIG. 1 in accordance with some non-limiting implementations of the present technology.

FIG. 4 is a schematic optical architecture of a WSS device 400 implementing the SLM device 100 in accordance with some non-limiting implementations of the present technology. In this implementation, the WSS device 400 includes an input/output module 410 including a cluster of hexagonally packed fiber array/ports (FA) 412 (e.g., 13 ports for a 1×12 WSS), a corresponding collimating lens array 414, and a Fourier-transform lens 416. Each lens of the collimating lens array 414 collimates the light from the corresponding input/output port, which is then focused onto the plane $P_0$ by the Fourier-transform lens 416.

Plane $P_0$ is also the interface to a relay module 420 which is a symmetric 4-f relay in the present implementation. More specifically, the relay module 420 includes a first bulk lens 422 and a second bulk lens 424 and a demultiplexing (DEMUX) diffraction grating 426. Light from plane $P_0$ is collimated by the first bulk lens 422, thereby forming an expanded beam, which further impinges onto DEMUX diffraction grating 426 which imparts an angular displacement to each wavelength channel in the x-z plane. Finally, the second bulk lens 424 focuses the light onto the SLM device 100. Overall, the relay module 420 images the plane $P_0$ onto the SLM device 100.

For example and without limitation, in order to accommodate 120 wavelength channels, sub-holograms of 34×34 pixels are displayed on the SLM device 100 with 4096 pixels available along its x-axis to switch 50 GHz channels. Each sub-hologram encodes a wavefront pattern onto the beam of the corresponding wavelength channel to deflect it by a given angle, which is subsequently imaged back to plane $P_0$ by the relay module 420. Given the telecentric arrangement of the input/output module 410, the Fourier-transform lens 416 converts the encoded wavefront tilts to positional offsets with respect to the input optical axis, while the collimating lens array 414 ensures that the individual wavelength channels are efficiently coupled into the target output fiber ports. The sub-holograms can generally impart wavefront tilts toward any 2D direction, which means that the optical beam of the corresponding wavelength channel can be steered to any output port of the input/output module 410.

In some implementations, a relatively large number of WSSs to be integrated into a single module by stacking and only uses a single set of optics and one SLM device 100. Such a stacked WSS can be configured, for example, to support a 1×M WSS with M≤144 or an N×N wavelength cross-connect with N≤12. In these implementations, the first and second bulk lenses 422, 424 are replaced by lens arrays that are periodic in the y direction.

Figure 5:
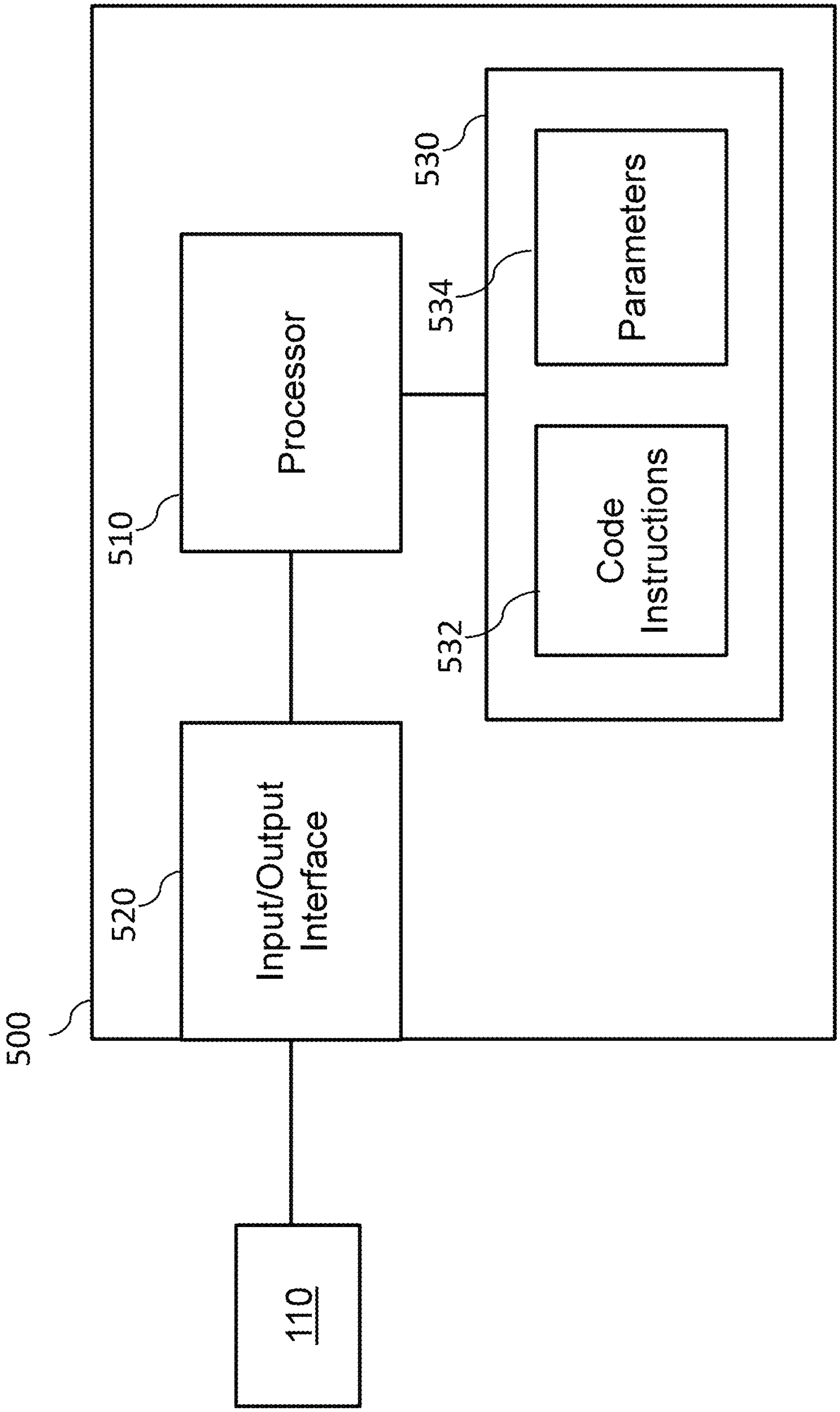
FIG. 5 is a block diagram of a controller of the SLM device of FIG. 1.

FIG. 5 is a schematic block diagram of the controller 500 of the SLM device 100 according to one non-limiting embodiment of the present technology. The controller 500 includes a processor or a plurality of cooperating processors (represented as a processor 510 for simplicity), a memory device or a plurality of memory devices (represented as a memory device 530 for simplicity), and an input/output interface 520 allowing the controller 500 to communicate with other components of the SLM device 100 and/or other components in remote communication with the SLM device 100. The processor 510 is operatively connected to the memory device 530 and to the input/output interface 520. The memory device 530 includes a storage for storing parameters 534. The memory device 530 may comprise a non-transitory computer-readable medium for storing code instructions 532 that are executable by the processor 510 to allow the controller 500 to perform the various tasks allocated to the controller 500 in the operation of the SLM device 100.

The controller 500 is operatively connected, via the input/output interface 520, to the electronic backplane 110. The controller 500 executes the code instructions 532 stored in the memory device 530 to implement the various above-described functions that may be present in a particular embodiment. FIG. 5 as illustrated represents a non-limiting embodiment in which the controller 500 orchestrates operations of the SLM device 100. This particular embodiment is not meant to limit the present disclosure and is provided for illustration purposes.

It will also be understood that, although the implementations and embodiments presented herein have been described with reference to specific features and structures, it is clear that various modifications and combinations may be made without departing from such disclosures. The specification and drawings are, accordingly, to be regarded simply as an illustration of the discussed implementations or embodiments and their principles as defined by the appended claims, and are contemplated to cover any and all modifications, variations, combinations or equivalents that fall within the scope of the present disclosure.

The invention claimed is:

1. A spatial light modulation device comprising:
an electronic backplane; and
a pixel array structure comprising a plurality of pixels, each pixel comprising:
a reflective layer disposed atop the electronic backplane;
a phase change material (PCM) layer disposed atop the reflective layer, a phase of the PCM layer being selectively in a crystalline state or an amorphous state based on a temperature thereof; and
an encapsulation layer disposed atop the PCM layer such that the PCM layer is sandwiched between the reflective layer and the encapsulation layer, a lower surface of the encapsulation layer touching an upper surface of the PCM layer, and a lower surface of the PCM layer touching an upper surface of the reflective layer;
the electronic backplane being operatively connected to a controller, the electronic backplane being configured to generate, based on instructions received from the controller, electrical current for defining an independent heat profile in the PCM layer of each pixel of the pixel array structure through Joule's effect, a variation of the phase of the PCM layer being used to modulate optical properties of an incoming optical signal reaching the spatial light modulation device.

2. The spatial light modulation device of claim 1, further comprising, for a given pixel of the plurality of pixels:
a first electrode and a second electrode thermally connected to the reflective layer and distant from one another;
the controller being configured to cause the electronic backplane to generate electrical current flowing from the first electrode to the second electrode to define heat profiles in the PCM layer through Joule's effect.

3. The spatial light modulation device of claim 2, further comprising:
a heater layer thermally connected to the first and second electrodes; and
an electrically insulating layer disposed between the reflective layer and the heater layer.

4. The spatial light modulation device of claim 3, wherein the heater layer is made of aluminum doped zinc oxide (AZO) and the insulating layer is made of aluminum nitride (AlN).

5. The spatial light modulation device of claim 1, wherein the PCM layer is formed from one of:
antimony trisulfide ($Sb_2S_3$); and
antimony triselenide ($Sb_2Se_3$).

6. The spatial light modulation device of claim 1, wherein:
the electronic backplane is a Silicon-based Complementary Metal Oxide Semiconductor (CMOS) backplane,
the reflective layer is made of aluminum, and
the encapsulation layer is made of indium tin oxide (ITO).

7. The spatial light modulation device of claim 1, wherein the pixel array structure configured for an active matrix driving scheme.

8. The spatial light modulation device of claim 1, wherein the controller has a digital driving scheme, the controller being configured to adjust a pulse width and a pulse duration of the electrical current.

9. The spatial light modulation device of claim 1, further comprising an electric current mirroring circuit communicably connected to the controller for defining an electric current programming scheme of the optical modulation device.

10. The spatial light modulation device of claim 1, further comprising a glass layer disposed atop the encapsulation layer.

* * * * *